United States Patent
Efstathopoulos et al.

(10) Patent No.: US 10,277,625 B1
(45) Date of Patent: Apr. 30, 2019

(54) SYSTEMS AND METHODS FOR SECURING COMPUTING SYSTEMS ON PRIVATE NETWORKS

(71) Applicant: Symantec Corporation, Mountain View, CA (US)

(72) Inventors: Petros Efstathopoulos, Los Angeles, CA (US); Daniel Kats, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 153 days.

(21) Appl. No.: 15/279,421

(22) Filed: Sep. 28, 2016

(51) Int. Cl.
*H04L 29/06* (2006.01)
*G06F 21/57* (2013.01)

(52) U.S. Cl.
CPC .......... *H04L 63/145* (2013.01); *G06F 21/577* (2013.01); *H04L 63/1433* (2013.01); *H04L 63/20* (2013.01); *G06F 2221/034* (2013.01)

(58) Field of Classification Search
CPC ... H04L 63/1433; H04L 63/20; H04L 63/145; G06F 21/577
See application file for complete search history.

(56) References Cited

U.S. PATENT DOCUMENTS

| | | | | |
|---|---|---|---|---|
| 8,209,760 B1 * | 6/2012 | Hardman | ............... | G06F 21/577 726/25 |
| 8,959,643 B1 * | 2/2015 | Invernizzi | ........... | H04L 63/1425 713/187 |
| 9,239,908 B1 * | 1/2016 | Constantine | ............ | G06F 21/00 |
| 9,742,793 B2 * | 8/2017 | Bryant | ................ | H04L 63/1433 |
| 9,860,276 B2 * | 1/2018 | Crane | ..................... | H04L 63/20 |
| 2003/0154269 A1 * | 8/2003 | Nyanchama | ........ | H04L 63/1433 709/223 |
| 2005/0193430 A1 * | 9/2005 | Cohen | ................... | G06F 21/577 726/25 |

(Continued)

OTHER PUBLICATIONS

Sujit Magar; Systems and Methods for Reducing Infection Risk of Computing Systems; U.S. Appl. No. 15/279,412, filed Sep. 28, 2016.

(Continued)

*Primary Examiner* — James R Turchen
(74) *Attorney, Agent, or Firm* — FisherBroyles, LLP

(57) ABSTRACT

The disclosed computer-implemented method for securing computing systems on private networks may include (i) identifying a set of computing systems that are connected via a private network, (ii) calculating, for each computing system in the set, a malware-vulnerability rating that reflects a probability of the computing system being compromised by a malware attack, a malware-exposure rating that is based on a relationship between the computing system and one or more other computing system within the set, and a conditional infection probability that is based on the malware-vulnerability and malware-exposure ratings and that indicates a probability of the computing system becoming infected if one or more of the other computing systems are infected, and (iii) performing, based on the conditional infection probabilities of the computing systems in the set, a security action within the private network. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2006/0195905 | A1* | 8/2006 | Fudge | G06F 11/008 726/25 |
| 2012/0046989 | A1* | 2/2012 | Baikalov | G06Q 10/0635 705/7.28 |
| 2012/0143650 | A1* | 6/2012 | Crowley | G06F 21/554 705/7.28 |
| 2012/0144492 | A1* | 6/2012 | Griffin | G06F 21/56 726/25 |
| 2013/0191919 | A1* | 7/2013 | Basavapatna | G06F 21/577 726/25 |
| 2015/0074810 | A1* | 3/2015 | Saher | G06F 16/951 726/23 |
| 2015/0135262 | A1* | 5/2015 | Porat | G06F 21/552 726/1 |
| 2015/0278729 | A1* | 10/2015 | Hu | G06Q 10/0635 705/7.28 |
| 2016/0065594 | A1* | 3/2016 | Srivastava | H04L 63/1433 726/23 |
| 2016/0359900 | A1* | 12/2016 | Crisler | H04L 63/1441 |
| 2018/0084000 | A1* | 3/2018 | Baukes | H04L 63/1433 |
| 2018/0124091 | A1* | 5/2018 | Sweeney | H04L 63/1425 |

OTHER PUBLICATIONS

Vasileios Karyotis et al; Malware Diffusion Models for Modern Complex Networks, 1st Edition, Theory and Applications; http://store.elseyier.com/Malware-Diffusion-Models-for-Modern-Complex-Networks/Vasileios-Karyotis-/isbn-9780128027141/; Feb. 2, 2016.

Aron Laszka et al.; Estimating Systematic Risk in Real-World Networks; https://www.ifca.ai/fc14/papers/fc14_submission_159.pdf; 2014.

Yun Shen et al.; Systems and Methods for Identifying Malicious File Droppers; U.S. Appl. No. 15/064,633, filed Mar. 9, 2016.

* cited by examiner

SYSTEMS AND METHODS FOR SECURING COMPUTING SYSTEMS ON PRIVATE NETWORKS

BACKGROUND

Viruses, Trojans, spyware, and other kinds of malware are a constant threat to any computing device that requires network connectivity. Many different types of security systems exist to combat these threats, ranging from browser plug-ins to virus scanners to firewalls, and beyond. Many new instances and permutations of malware are created every day, requiring security systems to be constantly updated. Despite all this, many instances of malware still manage to infect computing devices and carry out a variety of malicious actions. Some varieties of malware may spread malicious files onto other computing devices that share a network with the infected device. Many different models have been designed to predict the spread of malware on networks.

Traditional systems for creating risk models may place emphasis on the perimeter: what is the risk of compromise, given certain factors. However, if the perimeter is breached, traditional models may be unable to quantify the risk associated with the exposure of the remaining systems to the compromised system. Traditional models, therefore, may be unable to identify systems most at risk of infecting other systems or being infected by other systems on the same network. The instant disclosure, therefore, identifies and addresses a need for systems and methods for securing computing systems on private networks.

SUMMARY

As will be described in greater detail below, the instant disclosure describes various systems and methods for securing computing systems on private networks.

In one example, a computer-implemented method for securing computing systems on private networks may include (i) identifying a set of computing systems that are connected via a private network, (ii) calculating, for each computing system in the set, (a) a malware-vulnerability rating that is based on a current configuration of the computing system and that reflects a probability of the computing system being compromised by a malware attack, (b) a malware-exposure rating that is based on a relationship between the computing system and one or more other computing systems within the set and that reflects a probability of the computing system being exposed to malware if one or more of the other computing systems are infected, and (c) a conditional infection probability that is based on the malware-vulnerability and malware-exposure ratings and that indicates a probability of the computing system becoming infected if the one or more of the other computing systems are infected, and (iii) performing, based on the conditional infection probabilities of the computing systems in the set, a security action within the private network.

In one embodiment, the private network may include a local area network. In some embodiments, the private network may include a virtual network hosted in one or more data centers. In one example, the set of computing systems connected via the private network may include every device connected to the private network.

In some examples, calculating the malware-exposure rating may include determining a number of ports that communicate between the computing system and the one or more other computing systems. Additionally or alternatively, calculating the malware-exposure rating may include determining a volume of network traffic between the computing system and the one or more other computing systems.

In some embodiments, calculating, for each computing system in the set, the conditional infection probability may include calculating, for each computing system in the set, a probability that the computing system will become infected if any particular computing system in the set of computing systems is infected. In one embodiment, the computer-implemented method may further include determining, based on the conditional infection probabilities, a keystone computing system within the set that, if infected, has the highest probability of causing a maximum number of other computing systems within the set to become infected compared to every other computing system within the set.

In one embodiment, a system for implementing the above-described method may include (i) an identification module, stored in memory, that identifies a set of computing systems that are connected via a private network, (ii) a calculation module, stored in memory, that calculates, for each computing system in the set, (a) a malware-vulnerability rating that is based on a current configuration of the computing system and that reflects a probability of the computing system being compromised by a malware attack, (b) a malware-exposure rating that is based on a relationship between the computing system and one or more other computing systems within the set and that reflects a probability of the computing system being exposed to malware if one or more of the other computing systems are infected, and (c) a conditional infection probability that is based on the malware-vulnerability and malware-exposure ratings and that indicates a probability of the computing system becoming infected if one or more of the other computing systems are infected, (iii) a security module, stored in memory, that performs, based on the conditional infection probabilities of the computing systems in the set, a security action within the private network, and (iv) at least one physical processor configured to execute the identification module, the calculation module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a set of computing systems that are connected via a private network, (ii) calculate, for each computing system in the set, (a) a malware-vulnerability rating that is based on a current configuration of the computing system and that reflects a probability of the computing system being compromised by a malware attack, (b) a malware-exposure rating that is based on a relationship between the computing system and one or more other computing system within the set and that reflects a probability of the computing system being exposed to malware if one or more of the other computing systems are infected, (c) a conditional infection probability that is based on the malware-vulnerability and malware-exposure ratings and that indicates a probability of the computing system becoming infected if one or more of the other computing systems are infected, and (iii) perform, based on the conditional infection probabilities of the computing systems in the set, a security action within the private network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
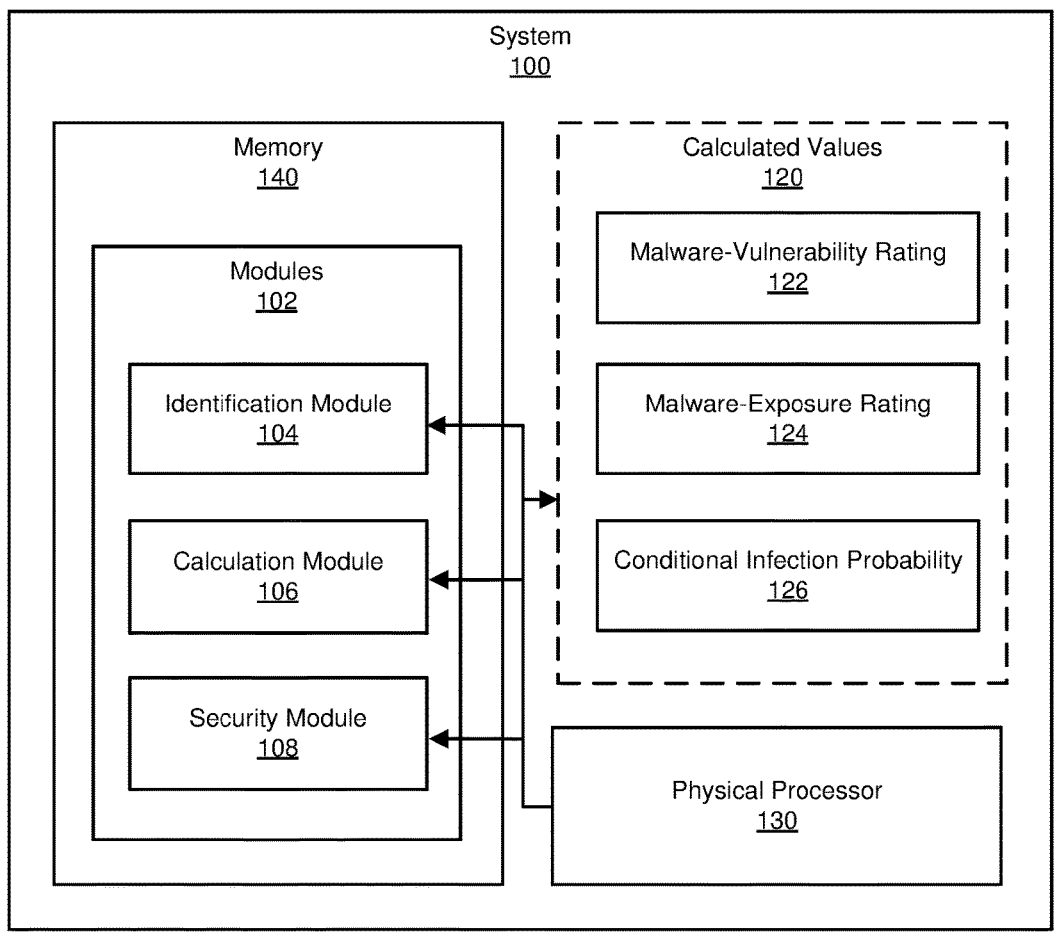
FIG. 1 is a block diagram of an example system for securing computing systems on private networks.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for securing computing systems on private networks. As will be explained in greater detail below, by calculating a conditional infection probability that each computing system may be infected by each other computing system, the systems and methods described herein may enable administrators to determine which computing systems on a network are most vulnerable to infection from other computing systems, which computing systems are most likely to infect the greatest number of other computing systems on the network, and/or by which paths infections are most likely to spread through a network. The systems described herein may not only quantify risk during and/or after an incident, but also calculate risk before exposure under the assumption of particular systems (e.g., Internet-facing servers) being compromised, allowing administrators to more effectively configure network security measures (e.g., firewalls, anti-malware applications, etc.) to protect the computing systems on the network from infection. In addition, the systems and methods described herein may improve the functioning of a computing device by determining the computing system or systems most likely to infect the computing device and enabling an administrator to deploy appropriate protections, thus reducing the computing device's likelihood of infection. These systems and methods may also improve the field of network security by enabling administrators to calculate the effects of one or more computing systems within a network becoming infected and exposing the other systems to potential infection.

Figure 2:
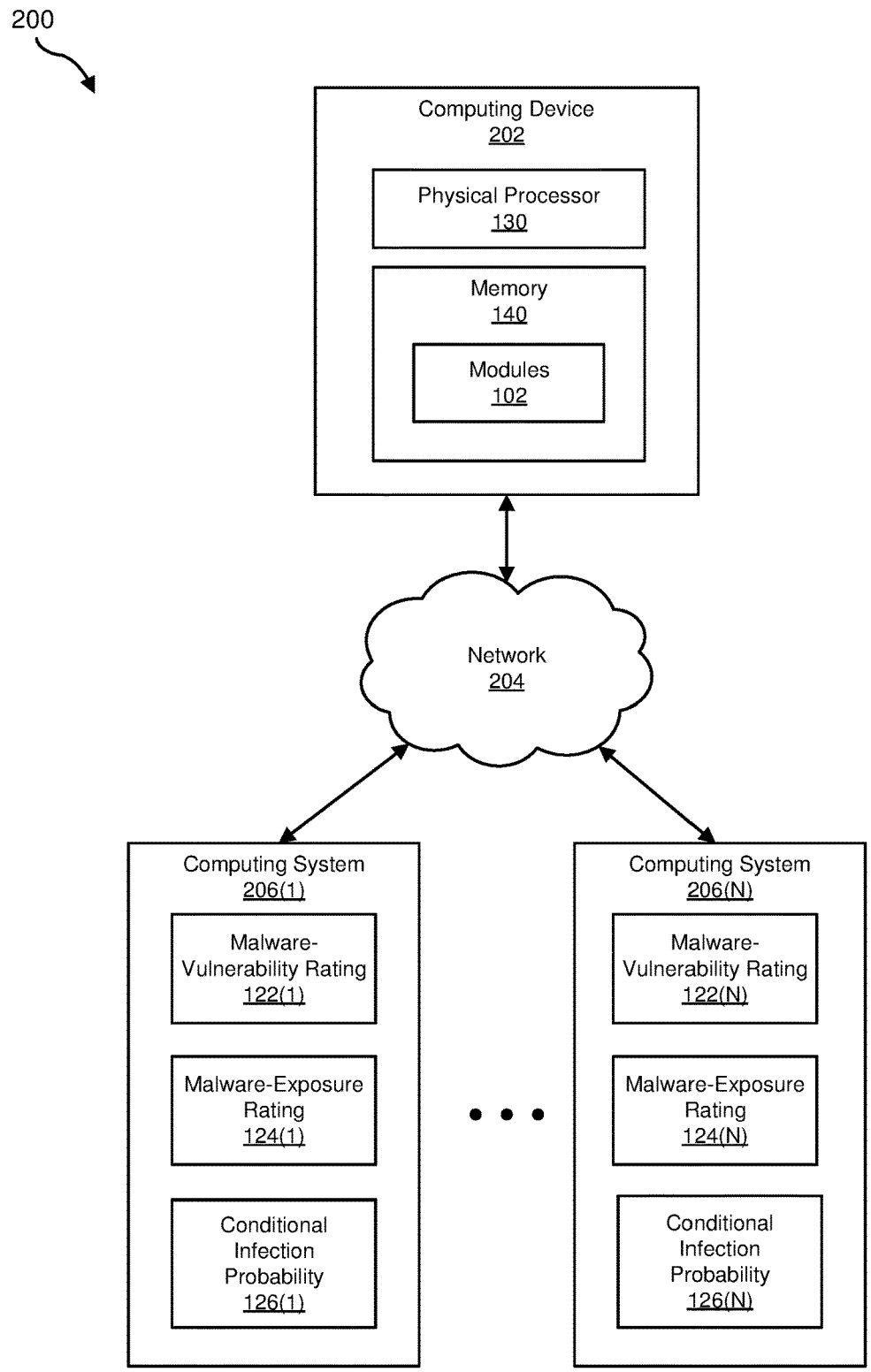
FIG. 2 is a block diagram of an additional example system for securing computing systems on private networks.
Figure 4:
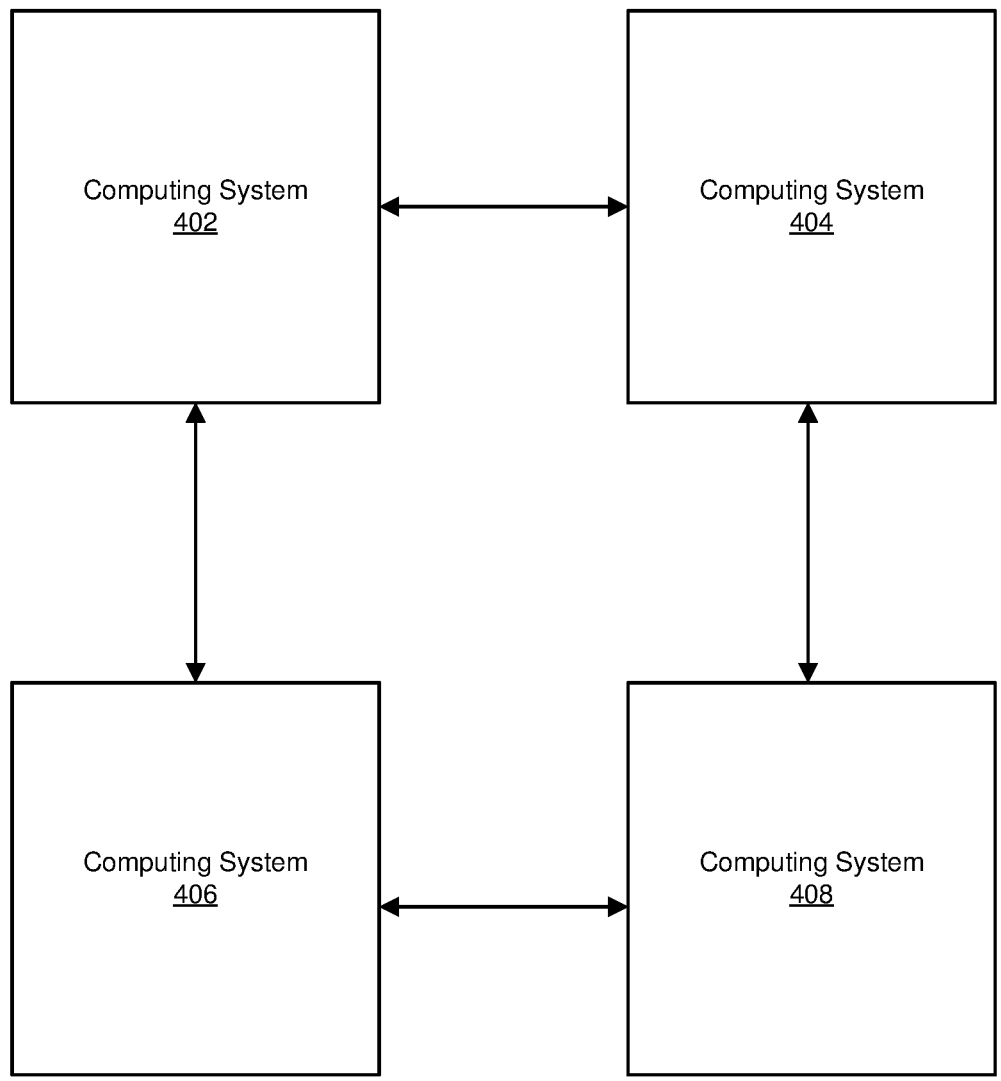
FIG. 4 is a block diagram of an example topology of a private network.
Figure 5:
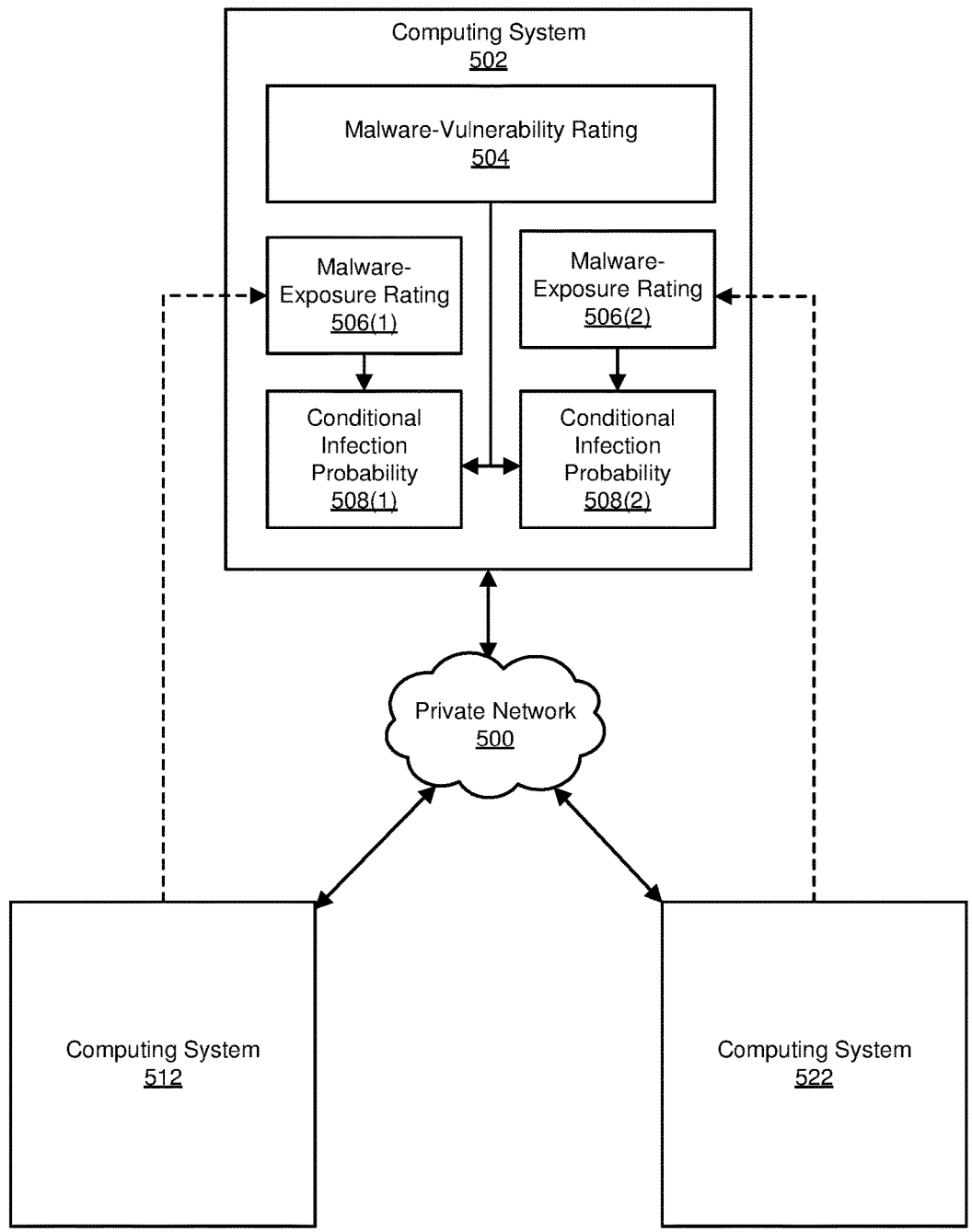
FIG. 5 is a block diagram of an example computing system for securing computing systems on private networks.

The following will provide, with reference to FIGS. 1, 2, and 5, detailed descriptions of example systems for securing computing systems on private networks. Detailed descriptions of corresponding computer-implemented methods will be provided in connection with FIG. 3. Detailed descriptions of an example topology of a private network will also be provided in connection with FIG. 4. In addition, detailed descriptions of an example computing system and network architecture capable of implementing one or more of the embodiments described herein will be provided in connection with FIGS. 6 and 7, respectively.

FIG. 1 is a block diagram of example system 100 for securing computing systems on private networks. As illustrated in this figure, example system 100 may include one or more modules 102 for performing one or more tasks. For example, and as will be explained in greater detail below, example system 100 may include an identification module 104 that identifies a set of computing systems that are connected via a private network. Example system 100 may additionally include a calculation module 106 that calculates, for each computing system in the set of computing systems, a malware-vulnerability rating, a malware-exposure rating, and a conditional infection probability. Example system 100 may also include a security module 108 that performs, based on the conditional infection probability, a security action within the private network. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or computing systems 206(1)-206(N)). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate securing computing systems on private networks. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more calculated values 120 such as malware-vulnerability rating 122, malware-exposure rating 124, and/or conditional infection probability 126. Malware-vulnerability rating 122 generally represents any type or form of measurement of the vulnerability of a computing system to infection by malicious applications, software, and/or scripts. In one example malware-vulnerability rating 122 may include a number. In other examples, malware-vulnerability rating 122 may include a percentage. Malware-exposure rating 124 generally represents any type or form of measurement of one computing system's likelihood of becoming infected by a specific other computing system, should the other computing system become infected. Malware-exposure rating 124 may include a number, a percentage, and/or any other suitable type of rating. Conditional infection probability 126 generally represents any type or form of representation of a computing system's likelihood of becoming infected by malware. Conditional infection probability 126 may include, without limitation, a number, a percentage, and/or a categorization.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with computing systems 206(1)-206(N) via a network 204. In one example, all or a portion of the functionality of modules 102 may be performed by computing device 202, computing systems 206(1)-206(N), and/or any other suitable computing system. As will be described in greater detail below, one or more of modules 102 from FIG. 1 may, when executed by at least one processor of computing device 202 and/or computing systems 206(1)-206(N), enable computing device 202 and/or computing systems 206(1)-206(N) to secure computing systems on private networks.

For example, and as will be described in greater detail below, identification module 104 may identify a set of computing systems that are connected via a private network. Next, calculation module 106 may calculate, for each computing system 206(1)-(N) in the set of computing systems, malware-vulnerability rating 122(1)-(N), malware-exposure rating 124(1)-(N), and/or conditional infection probability 126(1)-(N). Immediately and/or at some later time, security module 108 may perform, based on conditional infection probability 126, a security action within the private network.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device. In some embodiments, computing device 202 may be one of the computing systems 206(1)-(N) connected to the private network. In other embodiments, computing device 202 may be connected to computing systems 206(1)-(N) via a public network (e.g., the Internet) or may not be connected to computing systems 206(1)-(N) at all.

Computing systems 206(1)-(N) generally represent any type or form of computing systems capable of reading computer-executable instructions. Examples of computing systems 206(1)-(N) include, without limitation, laptops, tablets, desktops, servers, gateways, household smart devices, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Network 204 generally represents any medium or architecture capable of facilitating communication or data transfer. In one example, network 204 may facilitate communication between computing device 202 and computing systems 206(1)-(N). In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
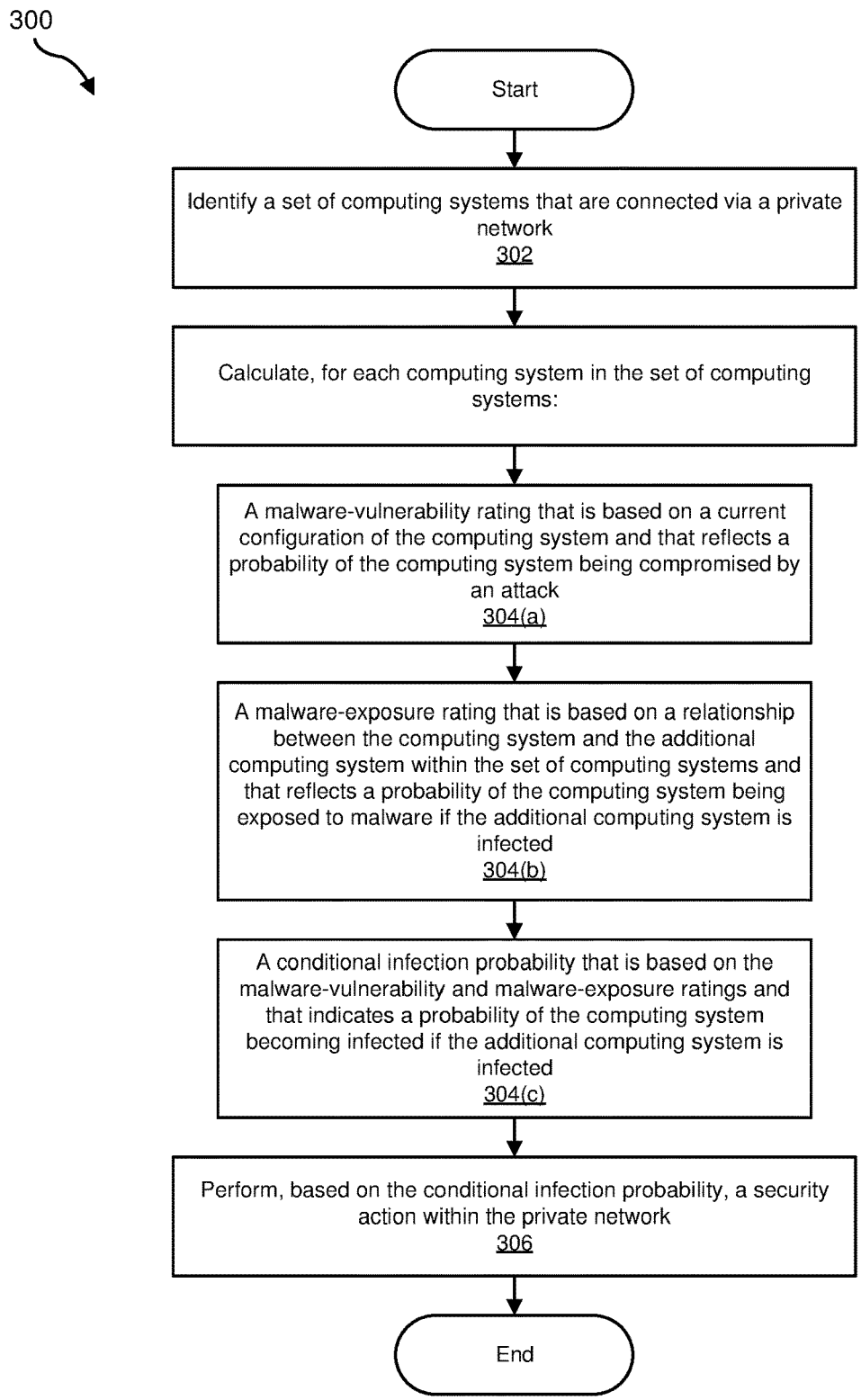
FIG. 3 is a flow diagram of an example method for securing computing systems on private networks.

FIG. 3 is a flow diagram of an example computer-implemented method 300 for securing computing systems on private networks. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a set of computing systems that are connected via a private network. For example, identification module 104 may, as part of computing device 202 in FIG. 2, identify a set of computing systems that are connected via a private network.

The term "private network," as used herein, generally refers to any network that requires authentication and/or authorization for access. In some embodiments, a private network may be protected by one or more security systems such as a hardware and/or software firewall that examines and/or filters traffic from outside the network. In one embodiment, a private network may be a local area network that consists of systems that are in the same physical location. In another embodiment, a private network may be a virtual network that consists of systems hosted in one or more data centers across one or more physical networks (i.e., the cloud). In some embodiments, while the computing systems that form the private network may be hosted on the public cloud, the network between the computing systems may be considered private because of security measures configured to monitor, block, and/or filter communication between the computing systems that are within the virtual network and computing systems that are outside the virtual network. In some embodiments, all traffic to the private network may pass through a single gateway device and/or system.

Identification module 104 may identify the private network in a variety of contexts. For example, identification module 104 may be installed on one of the computing systems connected to the private network. In other examples, identification module 104 may be installed on an external computing system. In some embodiments, identification module 104 may automatically monitor the private network to detect when computing systems and/or connections are added, removed, and/or modified. In other embodiments, identification module 104 may be triggered by an administrator.

In one embodiment, the set of computing systems connected via the private network may include every device connected to the private network. For example, a set of computing systems in an office may include several desktops, a networked printer, and/or a router. In another embodiment, the set of computing systems may only include a certain type or types of computing system, such as only desktops, only servers, only smart appliances, and/or all devices besides gateway devices. Additionally or alternatively, the set of computing systems may include a subset of all the systems connected via the private network chosen by any criteria, including but not limited to only Internet-facing systems, only non-Internet-facing systems, only systems with a certain owner, and/or only devices with administrative systems.

At step 304(a), one or more of the systems described herein may calculate, for each computing system in the set, a malware-vulnerability rating that is based on a current configuration of the computing system and that reflects a probability of the computing system being compromised by a malware attack. For example, calculation module 106 may, as part of computing device 202 in FIG. 2, calculate, for each computing system 206(1)-(N) in the set, malware-vulnerability rating 122(1)-(N) that is based on a current configuration of the computing system and that reflects a probability of the computing system being compromised by a malware attack.

The term "compromised by a malware attack," as used herein, generally refers to a situation where a computing system has been exposed to malware and becomes infected by that malware. For example, a computing system that downloads a file containing a virus but immediately quarantines and/or deletes that file before the virus can take action has been exposed to malware but has not been compromised by a malware attack. However, a computing system that downloads a file containing a virus and the virus then takes one or more actions on the computing system has been compromised by a malware attack.

Calculation module 106 may calculate the malware-vulnerability rating based on a variety of factors. For example, calculation module 106 may calculate a malware-vulnerability rating for a computing system based on the type of computing system (e.g., server vs. desktop vs. router), whether or not the computing system is Internet-facing, what applications are running on the computing system, which ports on the computing system are open, what operating system is configured on the computing system, whether the computing system is configured with anti-malware applications, the number of active users of the computing system, the privileges of the users on the computing system, and/or the historical probability of computing systems with similar configurations to the computing system becoming compromised. In some embodiments, calculation module 106 may weight different factors to arrive at the malware-vulnerability rating.

At step 304(b), one or more of the systems described herein may calculate, for each computing system in the set of computing systems, a malware-exposure rating that is based on a relationship between the computing system and one or more other computing systems within the set of computing systems and that reflects a probability of the computing system being exposed to malware if the other computing systems are infected. For example, calculation module 106 may, as part of computing device 202 in FIG. 2, calculate, for each computing system 206(1)-(N) in the set, malware-exposure rating 124(1)-(N) that is based on a relationship between the computing system and the other computing systems within the set and that reflects a probability of the computing system being exposed to malware if one or more of the other computing systems are infected.

The term "exposed to malware," as used herein, generally refers to a situation where one computing system is infected with a piece of malware and transmits that malware to a second computing system. In this situation, the second computing system has been exposed to malware by the first computing system, whether or not the second computing system becomes infected by the malware.

Calculation module 106 may calculate the malware-exposure rating based on a variety of factors. In some embodiments, calculation module 106 may calculate a malware-exposure rating that is either a 1 or a 0, depending on whether or not the computing system communicates directly with the other computing system. In other embodiments, calculation module 106 may calculate a finer-grained malware-exposure rating, for example a number between 1 and 0, an integer, and/or a percentage that represents the amount of communication between the computing system and the other computing system. For example, if $E_A(B)$ is said to represent the exposure of host A to host B, then calculation module 106 may use the equation $0 \leq E_A(B) \leq 1$.

In some examples, calculation module 106 may calculate the malware-exposure rating by determining a number of ports that communicate between the computing system and the other computing system. For example, a computing system that communicates via several ports with another computing system may be more exposed to infection by that computing system than a computing device that communicates via only one port, or that does not communicate at all. In some embodiments, calculation module 106 may weight different ports differently depending on the type of applications that communicate through that port, the probability that those applications have vulnerabilities, and/or historical data about vulnerabilities of applications on that port. For example, a port that is used for name service queries may be historically less subject to vulnerabilities than a port that is used for file transfer, and thus calculation module 106 may weight communication on the name service port as a lower malware-exposure factor than communication on the file transfer port. In one example, a computing system that communicates with another computing system on two low-risk ports (in this example weighted at 0.1 each) and one high-risk port (in this example weighted at 0.3) may have a malware-exposure rating of 0.5. In some embodiments, calculation module 106 may calculate the malware-exposure rating based on the number and/or type of connections between the two computing systems that are permitted by network topology. In other embodiments, calculation module 106 may calculate the malware-exposure rating based on which ports and/or services are actually used to communicate between the two computing systems.

Additionally or alternatively, calculation module 106 may calculate the malware-exposure rating by determining a volume and/or frequency of network traffic between the computing system and the other computing system. For example, a computing system that frequently receives a large amount of traffic from another computing system may be more exposed to infection by that computing system than a computing device that receives only a small amount of traffic, or that does not receive any traffic. In some embodiments, calculation module 106 may weight traffic by which port the traffic is routed through. In one example, a computing system that receives 10 MB of traffic per day from another computing system on a high-risk port may have a malware-exposure rating of 0.8, while another computing system that receives 10 MB of traffic per day from the same computing system on a low-risk port may only have a malware-exposure rating of 0.4. In some embodiments, calculation module 106 may use additional factors to calculate the malware-exposure rating, such as the number and/or privilege level of authentication events between two computing systems.

At step 304(*c*), one or more of the systems described herein may calculate, for each computing system in the set of computing systems, a conditional infection probability that is based on the malware-vulnerability and malware-exposure ratings and that indicates a probability of the computing system becoming infected if the other computing system is infected. For example, calculation module 106 may, as part of computing device 202 in FIG. 2, calculate, for each computing system 206(1)-(N) in the set of computing systems, conditional infection probability 126(1)-(N) that is based on malware-vulnerability rating 122(1)-(N) and malware-exposure rating 124(1)-(N) and that indicates a probability of the computing system becoming infected if the other computing system is infected.

Calculation module 106 may calculate the conditional infection probability in a variety of ways. For example, calculation module 106 may simply multiply the malware-exposure rating by the malware-vulnerability rating. For example, if P(B) is the probability that a computing system B is compromised, and P(A|B) is the probability that a computing system A is compromised given that B is compromised, calculation module 106 may use the equation $P(A|B)=E_A(B)*P(B)$.

In some embodiments, calculation module 106 may also factor indirect connections between computing systems into the conditional infection probability. For example, as illustrated in FIG. 4, a computing system 402 may communicate directly with computing systems 404 and/or 406 that may communicate with a computing system 408. In this example, calculation module 106 may calculate the conditional probability that computing system 404 will, if infected, infect computing system 402 based not just on the probability that computing system 404 will infect computing system 402 directly but also on the probability that computing system 404 will infect computing system 408 which will infect computing system 406 which will infect computing system 402. In this example, calculation module 106 may calculate the probability that computing system 404 will infect computing system 402 by combining the malware-exposure rating between computing systems 402 and 404 with the malware-vulnerability rating of computing system 402, and by also combining the conditional infection probability that computing system 404 will infect computing system 406 with the conditional infection probability that computing system 406 will infect computing system 408, and the conditional infection probability that computing system 408 will directly infect (as opposed to indirectly, via the same chain of computing systems in reverse) computing system 402.

In some embodiments, calculation module 106 may also calculate conditional infection probabilities for computing systems that do not communicate directly. For example, calculation module 106 may calculate the conditional probability that computing system 408 will infect computing system 402 by calculating the conditional probability that computing system 408 will infect computing system 406, and the conditional probability that computing system 406 will infect computing system 402, and/or the conditional probability that computing system 408 will infect computing system 404, and the conditional probability that computing system 404 will infect computing system 402.

In one embodiment, calculation module 106 may calculate the conditional infection probability by calculating, for each computing system in the set of computing systems, a probability that the computing system will become infected if any particular computing system in the set of computing systems is infected. For example, as illustrated in FIG. 5, computing systems 502, 512, and/or 522 may all be connected via a private network 500. In this example, calculation module 106 may calculate a malware-vulnerability rating 504 for computing system 502, and may also calculate a malware-exposure rating 506(1) that represents the likelihood of computing system 502 being exposed to malware by computing system 512, as well as a malware-exposure rating 506(2) that represents the likelihood of computing system 502 being exposed to malware by computing system 522. Next, calculation module 106 may calculate a conditional infection probability 508(1) based on malware-vulnerability rating 504 and malware-exposure rating 506(1) that represents the probability that computing system 502 will be infected by malware from computing system 512, as well as a conditional infection probability 508(2) based on malware-vulnerability rating 504 and malware-exposure rating 506(2) that represents the probability that computing system 502 will be infected by malware from computing system 522. Calculation module 106 may similarly calculate malware-exposure ratings and conditional infection probabilities for computing systems 512 and 522 in relation to each of the other computing systems.

In some embodiments, calculation module 106 may periodically re-calculate the malware-vulnerability ratings, malware-exposure ratings, and/or conditional infection probabilities for one or more computing systems connected to the private network. In one embodiment, calculation module 106 may automatically recalculate any or all of the values at a predetermined interval, for example, once per week. Additionally or alternatively, calculation module 106 may automatically recalculate values in response to one or more triggers, such as a change in network topology, a change in network configuration, and/or a change in configuration of one or more computing system.

For example, if new anti-virus software is installed on a computing system, calculation module 106 may recalculate that computing system's malware-vulnerability rating. In this example, the change in malware-vulnerability rating may also affect the computing system's conditional infection probabilities of being infected by any other computing system and thus may have a ripple effect on the conditional infection probabilities of computing systems that may spread infection via that computing system. For example, returning to FIG. 4, if new anti-virus software lowers the malware-vulnerability rating of computing system 406, and thus the conditional infection probabilities that any computing system will infect computing system 406, then the conditional infection probability that computing system 408 will infect computing system 402 via computing system 406 will also decrease. Note, however, that the conditional infection probability that computing system 406 will infect computing system 402 will not decrease because that conditional infection probability assumes that computing system 406 has already been infected.

By recalculating conditional infection probabilities based on network changes, the systems described herein may enable administrators to quickly see the impact of changes on the vulnerability of the network. For example, an administrator may discover that adding a single Internet-facing computing system with poor security has drastically increased conditional infection probabilities all across the network, while configuring more extensive security measures for another computing system has reduced conditional infection probabilities for a large number of systems.

Returning to FIG. 3, at step 306, one or more of the systems described herein may perform, based on the conditional infection probabilities of the computing systems in the set, a security action within the private network. For example, security module 108 may, as part of computing device 202 in FIG. 2, perform, based on conditional infection probabilities 126(1)-(N), a security action within the private network.

Security module 108 may perform a variety of security actions. For example, security module 108 may notify an administrator about the conditional infection probability. In another example, security module 108 may automatically configure computing system and/or network settings. For example, if a computing system has a conditional infection probability above a certain threshold, security module 108 may automatically install an anti-malware application on the computing system and/or reconfigure an already-installed anti-malware application. In some embodiments, security module 108 may perform a security action on all computing systems that have one or more conditional infection probabilities above a certain threshold and/or may perform different security actions based on different thresholds.

In some embodiments, the systems described herein may determine a keystone computing system within the set of computing systems that, if infected, has the highest probability of causing a maximum number of other computing systems within the set of computing systems to become infected compared to every other computing system within the set of computing systems. In some examples, after calculating conditional infection probabilities for every computing system connected via the private network relative to every other computing system connected via the private network, the systems described herein may rank the computing systems by the sum of the conditional infection probabilities for other computing systems to be infected by that computing system. In these examples, the computing system with the highest sum of conditional infection probabilities that reference that computing system may be the keystone computing system that is most likely to infect the most other computing systems if infected.

For example, returning to FIG. 5, in one example, conditional infection probability 508(1) may be significantly higher than conditional infection probability 508(2). In this example, computing system 522 may also have conditional probabilities indicating that computing system 522 is much more likely to be infected by computing system 512 than by computing system 502. In this example, the systems described herein may determine that computing system 512 has the highest probability of infecting the greatest number of other computing systems. In some examples, an administrator may then use this information to configure additional security measures for computing system 512, efficiently improving the overall security posture of the network.

As explained in connection with method 300 above, the systems and methods described herein may improve the security of computing systems on a private network by calculating which computing systems are most likely to infect and be infected by other computing systems on the network, should any computing system or systems within the network become compromised. First, the systems and methods described herein may calculate a malware-vulnerability rating for each computing system that represents the computing system's likelihood of becoming infected if exposed to malware, based on the current configuration of the computing system. Next, the systems and methods described herein may calculate a malware-infection rating for each computing system for each other computing system on the network that represents the probability of one computing system exposing the other to malware. Finally, the systems and methods described herein may use the previously calculated values to calculate conditional infection probabilities for each computing system in relation to each other computing system. The systems and methods described herein may then use these values to determine which computing systems are most vulnerable, which computing systems are most likely to spread infection, and/or which security and/or network topology changes are most likely to improve the overall security posture of the network. By determining which computing systems put the network most at risk, the systems and methods described herein may enable administrators to efficiently configure security measures on the most impactful systems on the network, saving both administrator time and computing resources.

Figure 6:
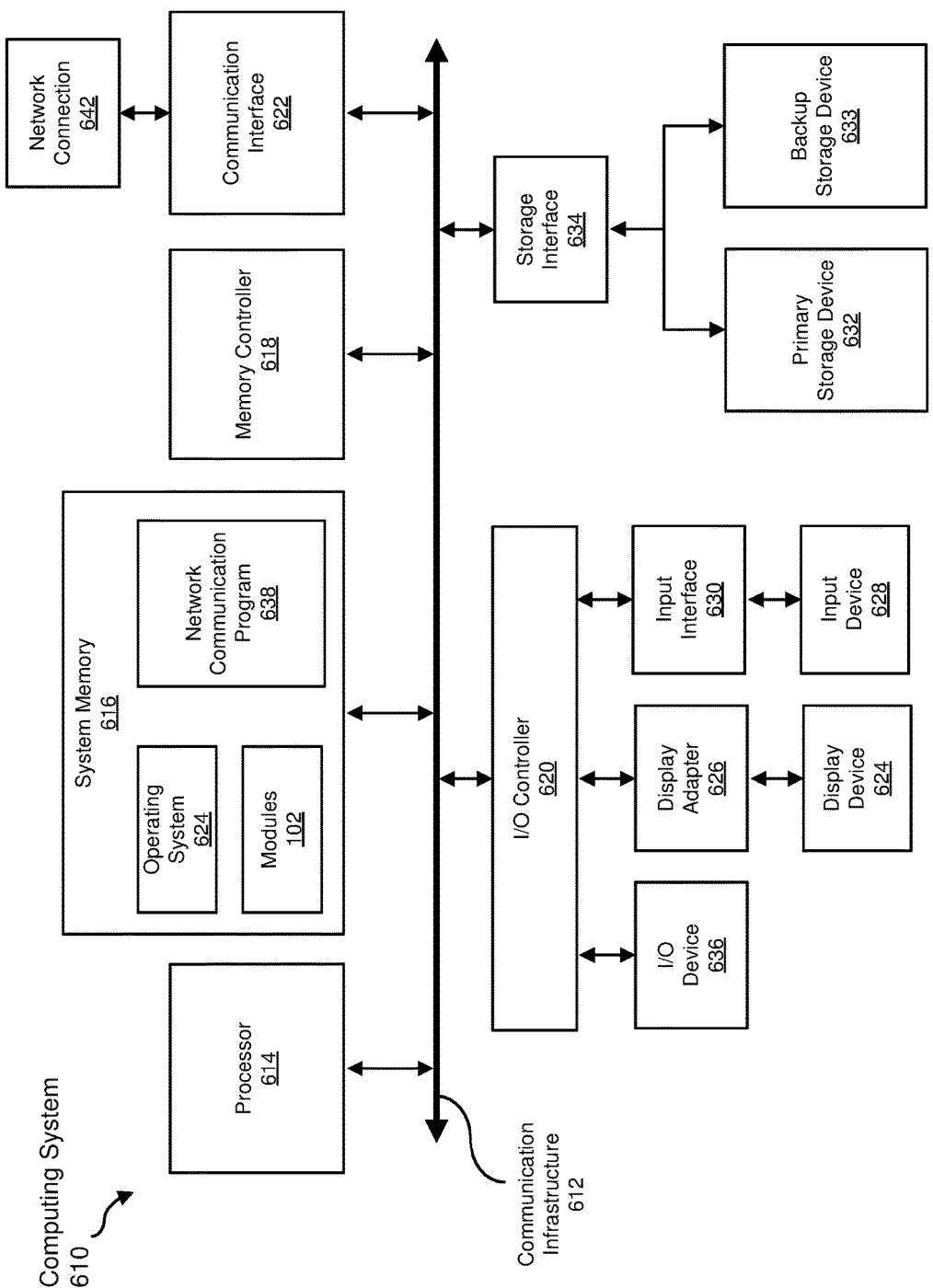
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 624 for execution by processor 614. In one example, operating system 624 may include and/or represent software that manages computer hardware and software resources and/or provides common services to computer programs and/or applications on computing system 610. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
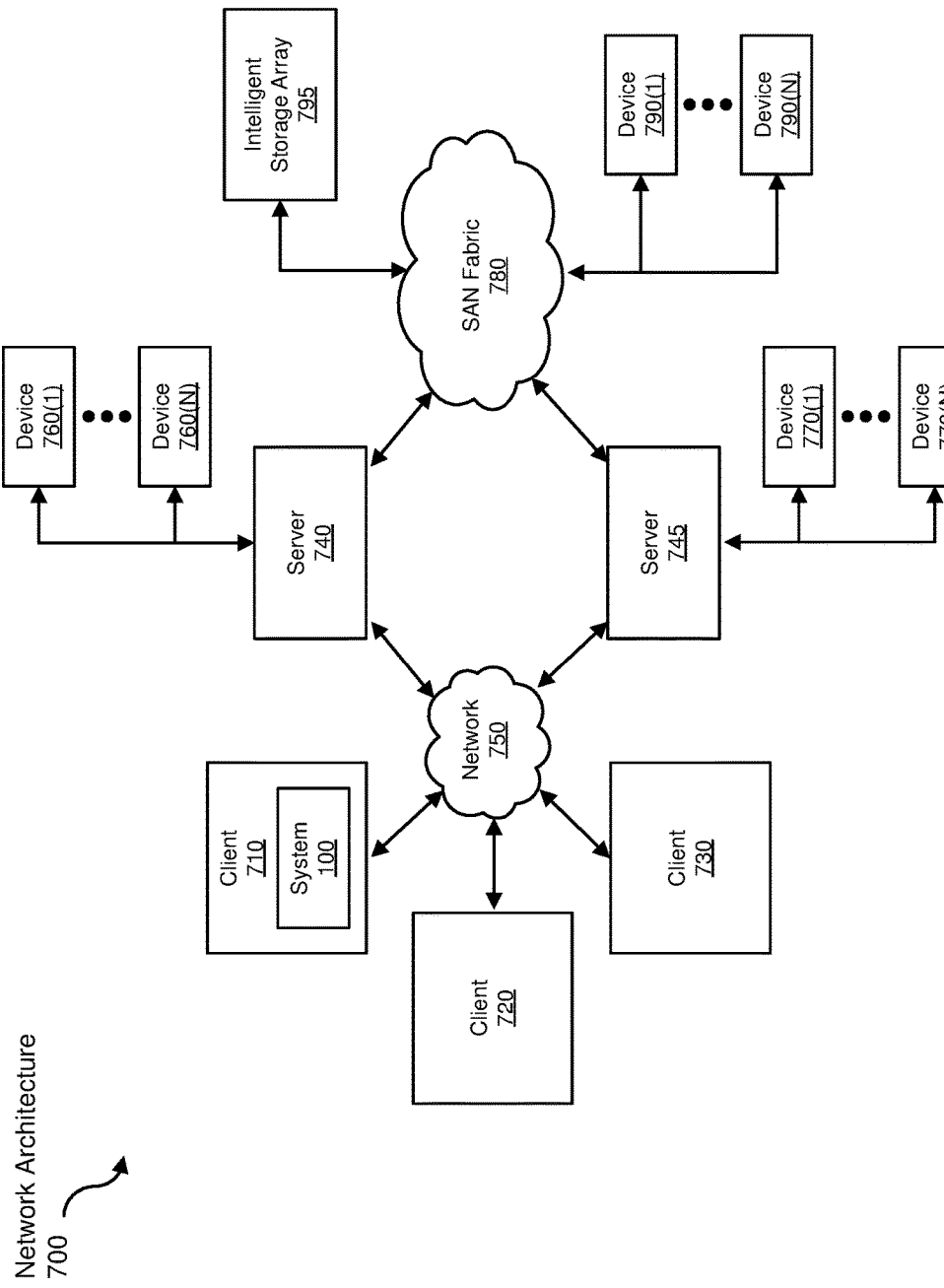
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for securing computing systems on private networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive computing system and/or network data to be transformed, transform the computing system and/or network data into ratings and/or probabilities, output a result of the transformation to an analysis application and/or visualization, use the result of the transformation to determine the vulnerability of systems on a network, and store the result of the transformation to a file. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for securing computing systems on private networks, at least a portion of the method being performed by a computing device comprising at least one processor, the method comprising:
   identifying a set of computing systems that are connected via a private network;
   calculating, for each computing system in the set:
      a malware-vulnerability rating that is based on a current configuration of the computing system and that reflects a probability of the computing system being compromised by a malware attack, wherein the probability comprises a historical probability of one or more other computing systems with similar configurations to the current configuration of the computing system within the set;
      a malware-exposure rating that is based on a relationship between the computing system and the one or more other computing systems within the set and that reflects a probability of the computing system being exposed to malware if one or more of the other computing systems are infected, the relationship comprising direct and indirect connections between the computing system and each of the one or more other computing systems within the set; and
      a conditional infection probability that is based on the malware-vulnerability and malware-exposure ratings and that indicates a probability of the computing system becoming infected if the one or more other computing systems are infected, wherein the conditional infection probability is calculated based, at least in part, on a combination of the malware-vulnerability rating for the computing system and the malware-exposure rating for each of the other computing systems; and
   performing, based on the conditional infection probabilities of the computing systems in the set, a security action within the private network.

2. The computer-implemented method of claim 1, wherein the set of computing systems connected via the private network comprises every device connected to the private network.

3. The computer-implemented method of claim 1, wherein calculating the malware-exposure rating comprises determining a number of ports that communicate between the computing system and the one or more other computing systems.

4. The computer-implemented method of claim 1, wherein calculating the malware-exposure rating comprises determining a volume of network traffic between the computing system and the one or more other computing systems.

5. The computer-implemented method of claim 1, wherein calculating, for each computing system in the set, the conditional infection probability comprises calculating, for each computing system in the set, a probability that the computing system will become infected if any particular computing system in the set is infected.

6. The computer-implemented method of claim 1, further comprising determining, based on the conditional infection probabilities, a keystone computing system within the set of computing systems that, if infected, has a highest probability of causing a maximum number of other computing systems within the set to become infected compared to every other computing system within the set.

7. The computer-implemented method of claim 1, wherein the private network comprises a local area network.

8. The computer-implemented method of claim 1, wherein the private network comprises a virtual network hosted in one or more data centers.

9. A system for securing computing systems on private networks, the system comprising:
   an identification module, stored in memory, that identifies a set of computing systems that are connected via a private network;

a calculation module, stored in memory, that calculates, for each computing system in the set:
   a malware-vulnerability rating that is based on a current configuration of the computing system and that reflects a probability of the computing system being compromised by a malware attack, wherein the probability comprises a historical probability of one or more other computing systems with similar configurations to the current configuration of the computing system within the set;
   a malware-exposure rating that is based on a relationship between the computing system and the one or more other computing systems within the set and that reflects a probability of the computing system being exposed to malware if one or more of the other computing systems are infected, the relationship comprising direct and indirect connections between the computing system and each of the one or more other computing systems within the set; and
   a conditional infection probability that is based on the malware-vulnerability and malware-exposure ratings and that indicates a probability of the computing system becoming infected if one or more of the other computing systems are infected, wherein the conditional infection probability is calculated based, at least in part, on a combination of the malware-vulnerability rating for the computing system and the malware-exposure rating for each of the other computing systems; and
a security module, stored in memory, that performs, based on the conditional infection probabilities of the computing systems in the set, a security action within the private network; and
at least one physical processor configured to execute the identification module, the calculation module, and the security module.

10. The system of claim 9, wherein the set of computing systems connected via the private network comprises every device connected to the private network.

11. The system of claim 9, wherein the calculation module calculates the malware-exposure rating by determining a number of ports that communicate between the computing system and the one or more other computing systems.

12. The system of claim 9, wherein the calculation module calculates the malware-exposure rating by determining a volume of network traffic between the computing system and the one or more other computing systems.

13. The system of claim 9, wherein the calculation module calculates, for each computing system in the set, the conditional infection probability by calculating, for each computing system in the set, a probability that the computing system will become infected if any particular computing system in the set is infected.

14. The system of claim 9, wherein the calculation module determines, based on the conditional infection probabilities, a keystone computing system within the set that, if infected, has a highest probability of causing a maximum number of other computing systems within the set to become infected compared to every other computing system within the set.

15. The system of claim 9, wherein the private network comprises a local area network.

16. The system of claim 9, wherein the private network comprises a virtual network hosted in one or more data centers.

17. A non-transitory computer-readable medium comprising one or more computer-readable instructions that, when executed by at least one processor of a computing device, cause the computing device to:
   identify a set of computing systems that are connected via a private network;
   calculate, for each computing system in the set:
      a malware-vulnerability rating that is based on a current configuration of the computing system and that reflects a probability of the computing system being compromised by a malware attack, wherein the probability comprises a historical probability of one or more other computing systems with similar configurations to the current configuration of the computing system within the set;
      a malware-exposure rating that is based on a relationship between the computing system and the one or more other computing systems within the set and that reflects a probability of the computing system being exposed to malware if one or more of the other computing systems are infected, the relationship comprising direct and indirect connections between the computing system and each of the one or more other computing systems within the set; and
      a conditional infection probability that is based on the malware-vulnerability and malware-exposure ratings and that indicates a probability of the computing system becoming infected if one or more of the other computing systems are infected, wherein the conditional infection probability is calculated based, at least in part, on a combination of the malware-vulnerability rating for the computing system and the malware-exposure rating for each of the other computing systems; and
   perform, based on the conditional infection probabilities of the computing systems in the set, a security action within the private network.

18. The non-transitory computer-readable medium of claim 17, wherein the set of computing systems connected via the private network comprises every device connected to the private network.

19. The non-transitory computer-readable medium of claim 17, wherein the one or more computer-readable instructions cause the computing device to calculate the malware-exposure rating by determining a number of ports that communicate between the computing system and the one or more other computing systems.

20. The non-transitory computer-readable medium of claim 17, wherein the one or more computer-readable instructions cause the computing device to calculate the malware-exposure rating by determining a volume of network traffic between the computing system and the one or more other computing systems.

* * * * *